(12) United States Patent
Herden et al.

(10) Patent No.: US 8,712,197 B2
(45) Date of Patent: Apr. 29, 2014

(54) IGNITION DEVICE IN PARTICULAR FOR AN INTERNAL COMBUSTION ENGINE, AND METHOD FOR MANUFACTURING SAME

(75) Inventors: Werner Herden, Gerlingen (DE); Martin Weinrotter, Stuttgart-Botnang (DE); Pascal Woerner, Stuttgart (DE); Manfred Vogel, Ditzingen (DE); Juergen Raimann, Weil der Stadt (DE); Bernd Schmidtke, Leonberg (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 979 days.

(21) Appl. No.: 12/733,651

(22) PCT Filed: Aug. 14, 2008

(86) PCT No.: PCT/EP2008/060665
§ 371 (c)(1),
(2), (4) Date: Jun. 24, 2010

(87) PCT Pub. No.: WO2009/037057
PCT Pub. Date: Mar. 26, 2009

(65) Prior Publication Data
US 2010/0282195 A1 Nov. 11, 2010

(30) Foreign Application Priority Data
Sep. 14, 2007 (DE) .................. 10 2007 044 010

(51) Int. Cl.
*G02B 6/00* (2006.01)
*F02P 23/04* (2006.01)

(52) U.S. Cl.
USPC ..................... 385/32; 385/12; 123/143 B

(58) Field of Classification Search
None
See application file for complete search history.

(56) References Cited

U.S. PATENT DOCUMENTS

| 4,917,014 A * | 4/1990 | Loughry et al. ............. 102/201 |
| 7,619,742 B2 * | 11/2009 | Sanders ........................ 356/451 |
| 2005/0063646 A1 * | 3/2005 | Gupta et al. ..................... 385/88 |
| 2006/0037572 A1 * | 2/2006 | Yalin et al. ................. 123/143 B |
| 2007/0068475 A1 * | 3/2007 | Kopecek et al. .......... 123/143 B |
| 2007/0127020 A1 | 6/2007 | Hikichi et al. |
| 2010/0031909 A1 * | 2/2010 | Herden et al. ............ 123/143 B |

FOREIGN PATENT DOCUMENTS

| DE | 199 57 808 | 6/2001 |
| EP | 1 767 777 | 3/2007 |
| WO | 98/11388 | 3/1998 |
| WO | 2006/061857 | 6/2006 |
| WO | 2008/000587 | 1/2008 |

* cited by examiner

*Primary Examiner* — Michelle R Connelly
(74) *Attorney, Agent, or Firm* — Kenyon & Kenyon LLP

(57) ABSTRACT

An ignition device, for an internal combustion engine of a motor vehicle, having a laser device for generating laser pulses, and having an optical fiber device which is at least optically connected to the laser device for supplying the laser device with pumped light. The optical fiber device is configured and situated in the region of the laser device such that radiation incident in the region of the laser device and/or in the region of a combustion chamber associated with the laser device is injected into the optical fiber device. The optical fiber device advantageously allow the radiation which is injected into the optical fiber device to be analyzed, using a detector which is remotely situated, without having to provide additional, separate optical fiber devices for the radiation to be analyzed, because is conducted directly via the same optical fiber that is already used for supplying pumped light.

11 Claims, 4 Drawing Sheets

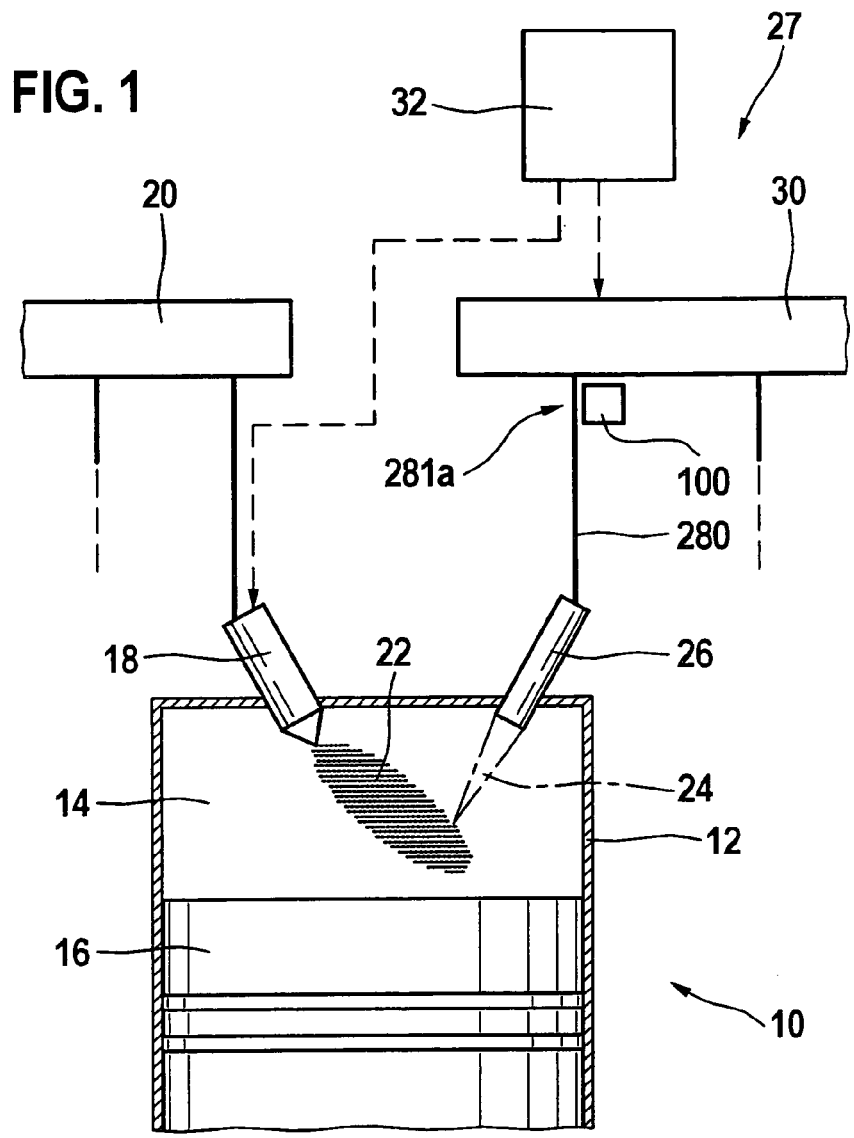
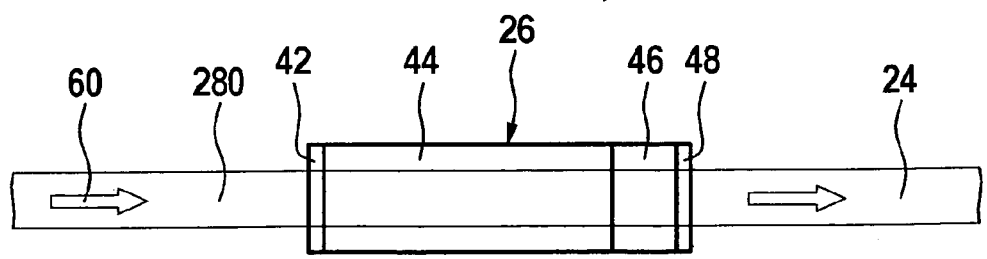

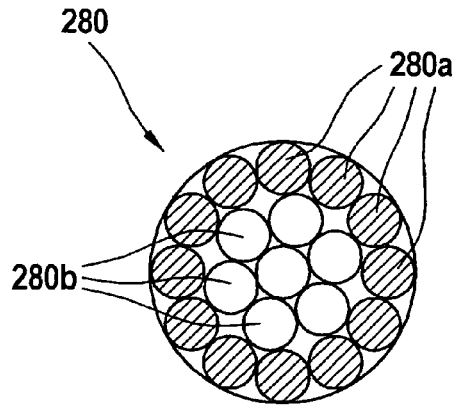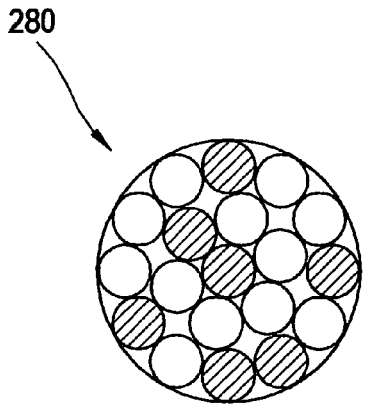
FIG. 3A  FIG. 3B
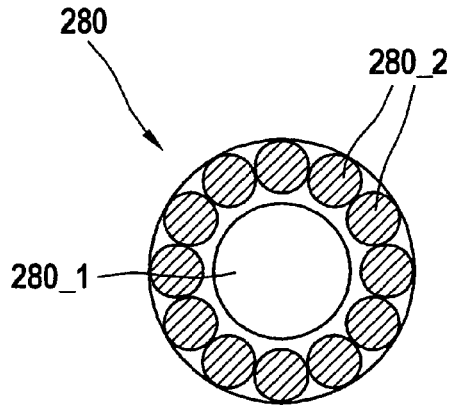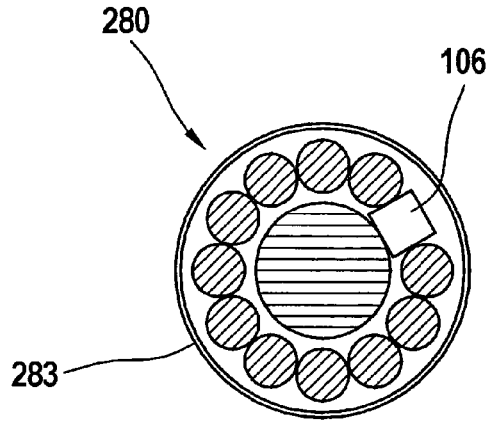
FIG. 3C  FIG. 3D
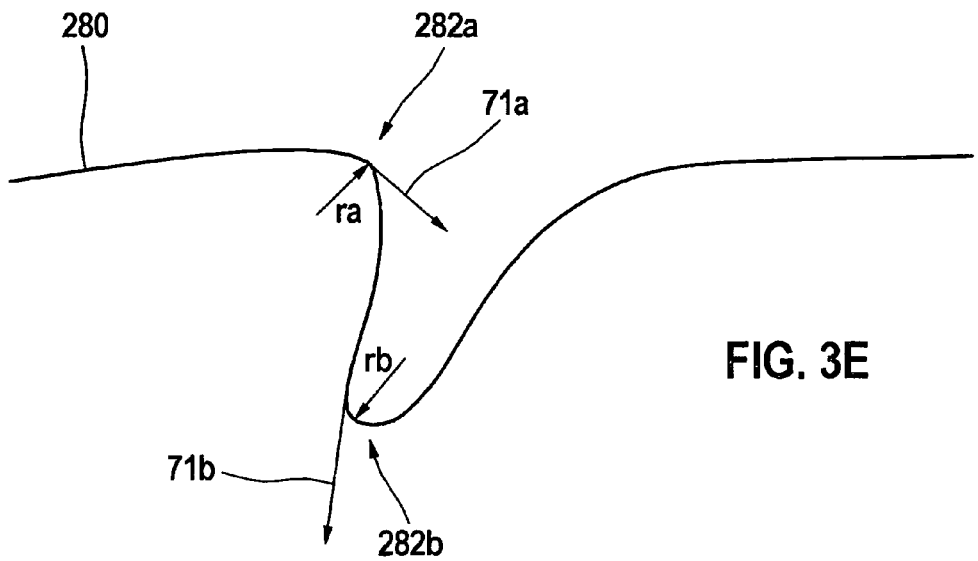
FIG. 3E // IGNITION DEVICE IN PARTICULAR FOR AN INTERNAL COMBUSTION ENGINE, AND METHOD FOR MANUFACTURING SAME

FIELD OF THE INVENTION

The present invention relates to an ignition device, in particular for an internal combustion engine of a motor vehicle, having a laser device for generating laser pulses, and having an optical fiber device which is at least optically connected to the laser device for supplying the laser device with pumped light. The present invention further relates to a method for manufacturing such an ignition device.

BACKGROUND INFORMATION

There are ignition devices for internal combustion engines of motor vehicles.

SUMMARY OF THE INVENTION

An object of the exemplary embodiments and/or exemplary methods of the present invention is to improve an ignition device and a method for manufacturing same in such a way that enables simple manufacture and reliable, flexible operation of the ignition device.

For the ignition device of the aforementioned type, this object is achieved according to the present invention by the fact that the optical fiber device is designed and situated in the region of the laser device in such a way that radiation incident in the region of the laser device and/or in the region of a combustion chamber associated with the laser device may be injected into the optical fiber device.

The design and configuration of the optical fiber device according to the present invention advantageously allow the radiation which is injected into the optical fiber device to be analyzed, in particular using a remotely situated detector, without having to provide additional, separate optical fiber devices for the radiation to be analyzed, because the radiation to be analyzed may be conducted directly via the same optical fiber that is already used for supplying pumped light. This results in a particularly simple configuration and correspondingly low manufacturing costs.

In one specific embodiment of the present invention it is provided in a particularly advantageous manner that the laser device is transmissive, at least partially, for wavelengths of the radiation, so that radiation to be analyzed may be injected, for example, from the combustion chamber directly through the laser device and into the optical fiber device.

A particularly simple mechanical configuration likewise advantageously results when an optical fiber device having only a single optical fiber is used.

The use, likewise provided by the exemplary embodiments and/or exemplary methods of the present invention, of an optical fiber device composed of multiple individual optical fibers advantageously allows a flexible configuration of the optical fibers in particular in the region of the laser device, so that a plurality of different configurations is provided solely on the basis of the distribution and location of the individual optical fibers in the region of the laser device. In particular, at least a first portion of the optical fibers forming the optical fiber device may also be used, among other things, for transmitting the radiation of interest from the laser device to a remotely situated evaluation device. Another portion of the optical fibers forming the optical fiber device may also be provided, for example, solely for transmitting pumped light to the laser device, and may accordingly be situated in the region of the laser device in such a way that it allows the most efficient possible irradiation of pumped light into the laser device, while there is little or no capability for injecting other radiation from the region of the laser device into this additional portion.

The multiple individual optical fibers may form a single strand which may optionally be sheathed and which has a correspondingly higher mechanical stability compared to a single fiber.

In one particularly advantageous specific embodiment of the ignition device according to the present invention, it is provided that at one end of the optical fiber device, situated at a distance from the laser device, a first number of optical fibers of the optical fiber device is associated with an evaluation device for evaluating the radiation. In this manner the radiation injected into the affected portion of the optical fibers in the region of the laser device may be evaluated by the remotely situated evaluation device.

According to the exemplary embodiments and/or exemplary methods of the present invention, the ignition device according to the present invention is manufactured in a particularly simple and efficient manner when the first number of optical fibers associated with the evaluation device is selected arbitrarily, i.e., in particular is not selected so that it belongs to the first portion, i.e., is part of the optical fibers which are intentionally provided in the region of the laser device, for example, in such a way that the radiation of interest may be injected into the optical fibers of this first portion. According to the exemplary embodiments and/or exemplary methods of the present invention it is recognized that a statistical selection process for optical fibers from the optical fiber device also generally ensures that a sufficient number of the individual optical fibers are associated with the evaluation device for which the radiation of interest is also injected in the other ends of the optical fibers in the region of the laser device.

This configuration according to the present invention advantageously eliminates the need to ascertain, during manufacture of the ignition device according to the present invention, specific individual optical fibers from the optical fiber device in which the radiation of interest is also injected. Rather, according to the exemplary embodiments and/or exemplary methods of the present invention a certain proportion of the total optical fibers present may be easily associated with the evaluation device, it being ensured due to the statistical nature of the selection processes that at least a few optical fibers are also always selected which are able to supply the radiation of interest from the region of the laser device to the evaluation device. In this variant of the present invention, the optical fibers which are not selected remain for supplying the laser device with pumped light.

A manufacturing process for the ignition device according to the present invention is advantageously further simplified by the fact that at least one optical fiber has a geometry which differs from the geometry of the other optical fibers of the optical fiber device. In particular, the different geometry may include a plurality of the optical fibers with a different cross section or diameter, so that a correspondingly simple differentiation may be made between optical fibers having a normal geometry and optical fibers having a different geometry according to the present invention.

For example, a single optical fiber of the optical fiber device according to the present invention may particularly be provided with a relatively large diameter, which may accordingly be used, for example, for transmitting the pumped light from a pumped light source to the laser device, while other optical fibers having a smaller diameter may be used, for example, for returning radiation of interest from the region of the laser device to the evaluation device.

Alternatively or additionally, it is possible to also use at least a portion of the optical fibers having a small cross section or diameter for transmitting pumped light. An inverse configuration is likewise conceivable; i.e., a single optical fiber having a relatively large cross section or diameter, for example, may be provided which is used for transmitting radiation of interest from the laser device to the evaluation device, while other optical fibers provided with a smaller cross section or diameter are used for supplying pumped light to the laser device.

In a further very advantageous specific embodiment of the ignition device according to the present invention, it is provided that in a partial region of its overall length the optical fiber device has a bending radius which is selected in such a way that in the partial region radiation conducted from the optical fiber device may be at least partially extracted from the optical fiber device. The extracted radiation may be pumped light supplied from a pumped light source, but the radiation of interest injected into the optical fiber device in the region of the laser device may be extracted at the region of the optical fiber device which is bent according to the present invention in order to supply the radiation to a corresponding evaluation device for analysis.

It may be further provided in a very particular manner that the bending radius is selected in such a way that the pumped light of a first wavelength is not extractable in the partial region, but that radiation of wavelengths which differ from the first wavelength of the pumped light may be extracted in the partial region. According to the exemplary embodiments and/or exemplary methods of the present invention, use is thus advantageously made of the wavelength dependency of the principle of total reflection, which allows light to be conducted in the optical fiber device or its individual optical fibers. In a particularly advantageous manner the wavelength of the pumped light used is matched to the ignition device or the bending radius of the optical fiber device and the wavelengths of the radiation to be analyzed in such a way that only the radiation of interest is selectively extractable over a corresponding curvature of the optical fiber device, while the pumped light is not extracted due to the curvature of the optical fiber device according to the present invention, and thus may be completely transmitted to the laser device.

In a further very advantageous configuration of the ignition device according to the present invention, it is provided that the optical fiber device has multiple partial regions with different bending radii, in which in each case radiation of different wavelengths may be extracted. An optical filter circuit in a manner of speaking is thus implemented, which, if the appropriate bending radii are specified, is thus able to extract corresponding wavelength ranges of the radiation conducted in the optical fiber device.

The appropriate bending radii are to be selected, among other factors, as a function of the number of individual optical fibers in such a way that, at least for a certain portion of the optical fibers, the total reflection of the wavelengths of interest is partially impaired in order to be able to extract the radiation.

In the partial regions in which radiation is to be extracted, the optical fiber device according to the present invention may particularly have an opening in a sheathing surrounding same, or also has a region of the sheathing which is at least partially transparent to the radiation to be extracted.

It may also advantageously be provided according to the present invention that in the partial regions of interest the optical fiber device has one integrated evaluation device, at least, however, one optoelectric converter, so that the signal extracted according to the present invention from the optical fiber device or the corresponding radiation may be directly evaluated in situ and converted to an electrical signal. According to the present invention, the electrical connections, for example cables, necessary for relaying the electrical signal to an evaluation circuit or control unit or the like, may be advantageously integrated into the optical fiber device, for example by enclosing the electrical connections together with the individual optical fibers in a common sheathing.

As an alternative or in addition to the optoelectric converter provided in situ, according to the present invention an additional optical fiber may also be provided which is essentially spatially separated from the remaining optical fibers. This additional optical fiber is able to relay the radiation extracted from the optical fiber device according to the present invention to a remotely situated optoelectric converter or evaluation device, and likewise may advantageously be integrated into a sheathing of the optical fiber device. Due to its spatial separation from the remaining optical fibers of the optical fiber device, even during manufacture of the ignition device according to the present invention the additional optical fiber may be easily distinguished from the remaining optical fibers and thus connected to an evaluation device in a targeted manner, while the remaining optical fibers are, for example, optically connected to a pumped light source. Alternatively or additionally, this additional optical fiber which may be used for purposes of analysis may be designed to be distinguishable from the remaining optical fibers by virtue of a different cross section or the like.

In a further very advantageous specific embodiment of the ignition device according to the present invention, it is provided that a pumped light source for generating the pumped light and an evaluation device for evaluating the radiation are provided at one end of the optical fiber device, situated at a distance from the laser device, the pumped light source being situated between the end of the optical fiber device and the evaluation device and being at least partially transparent to the radiation. It is recognized according to the present invention that some pumped light sources designed as a semiconductor laser are essentially transparent to wavelengths of interest of the radiation injected into the optical fiber device in the region of the laser device.

In this manner it is advantageously possible to use the entire optical fiber device according to the present invention on the one hand for transmitting pumped light to the laser device, and on the other hand for transmitting the radiation injected in the region of the laser device into at least a portion of the optical fibers of the optical fiber device in the reverse direction to the pumped light source, to pass through same, and in this manner to supply the radiation to the evaluation device provided downstream from the pumped light source.

The variant according to the present invention which allows a curvature in the optical fiber device with the objective of extracting a portion of the radiation to be analyzed, as well as the further variant in which an evaluation device is provided optically downstream from the pumped light source, advantageously allow use to be made of the entire cross section of the optical fiber device for transmitting the pumped light to the laser device, and for transmitting the radiation to be analyzed from the laser device to an evaluation device.

Particularly good matching of a cross section of the optical fiber device to further optical elements is provided according to the present invention by the fact that at one end of the optical fiber device, situated at a distance from the laser device, an optical cross-section converter is provided which fixes the individual optical fibers of the optical fiber system relative to one another in a specifiable manner, in particular in such a way that the individual optical fibers in the optical cross-section converter together form a cross section which differs from the cross section of the optical fiber system.

According to the exemplary embodiments and/or exemplary methods of the present invention, it is thus possible, for example, to transform an essentially circular cross section of the optical fiber device into an essentially rectangular or linear cross section, as is provided, for example, in frequently used semiconductor pumped light sources, for example, which are produced by a linear adjacent arrangement of multiple laser emitters.

As an alternative or in addition to the previously described configuration, in which the radiation to be analyzed is passed through the pumped light source before it reaches the evaluation device, a portion of the optical fibers of the optical fiber device conducting the radiation to be analyzed may also be transformed by the optical cross-section converter into a cross section which is optimally matched for the evaluation device provided downstream.

The principle according to the present invention may advantageously be used in ignition devices for internal combustion engines, in particular in motor vehicles, but may also be used very advantageously in conjunction with stationary engines, in particular large gas-fired engines, as well as turbines or the like.

A method for manufacturing an ignition device according to the description herein is provided as a further approach to achieving the object of the present invention.

Further advantageous designs are also described herein.

Further features, application possibilities, and advantages of the present invention result from the following description of exemplary embodiments of the present invention which are illustrated in the figures of the drawing. All described or illustrated features, alone or in any given combination, constitute the subject matter of the present invention, independent of their combination in the claims or back-reference, and independent of their wording or illustration in the description or drawing, respectively.

BRIEF DESCRIPTION OF THE DRAWINGS

FIG. 1 shows a schematic illustration of an internal combustion engine having an ignition device according to the present invention.

FIG. 2 shows a specific embodiment of the ignition device from FIG. 1 in detail.

FIGS. 3a, 3b, 3c, and 3d show different configurations of the optical fiber device according to the present invention, in cross section.

FIG. 3e schematically shows an optical fiber device, bent twice in a defined manner according to the present invention.

DETAILED DESCRIPTION

Figure 4:
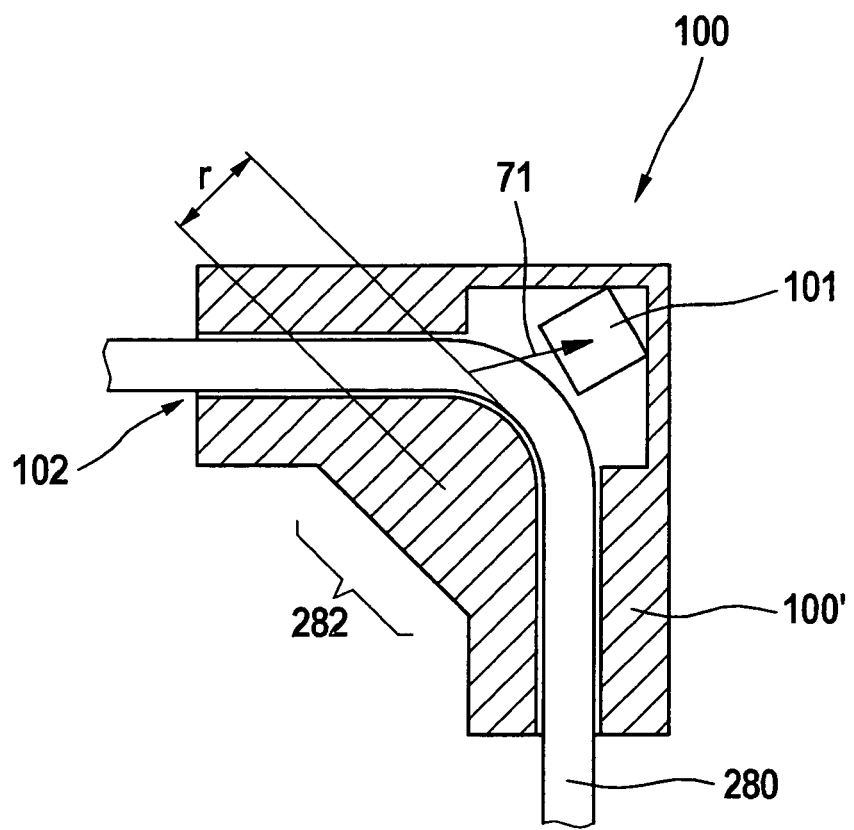
FIG. 4 shows a component of the ignition device according to the present invention for the defined bending of an optical fiber device, together with an integrated detector.

An internal combustion engine overall is denoted by reference numeral 10 in FIG. 1. The internal combustion engine is used to drive a motor vehicle, not illustrated, or to drive a generator. Internal combustion engine 10 includes multiple cylinders, of which only one is denoted by reference numeral 12 in FIG. 1. A combustion chamber 14 for cylinder 12 is delimited by a piston 16. Fuel passes directly into combustion chamber 14 via an injector 18 which is connected to a fuel pressure accumulator 20, also referred to as a common rail. The mixture may also be formed externally.

Fuel 22 injected into combustion chamber 14 is ignited using a laser pulse 24 which is emitted into combustion chamber 14 by an ignition device 27 which includes an ignition laser 26. For this purpose, laser device 26 is fed via an optical fiber device 280, using pumped light which is provided by a pumped light source 30. Pumped light source 30 is controlled by a control and regulation device 32 which also activates injector 18.

Pumped light source 30 may be, for example, a semiconductor laser diode which as a function of a control current emits corresponding pumped light to laser device 26 via optical fiber device 280. Although semiconductor laser diodes and other compact pumped light sources may be used in the automotive sector, in principle any type of pumped light source may be used for operating ignition device 27 according to the present invention.

FIG. 2 schematically shows a detailed view of ignition device 27 from FIG. 1.

As shown in FIG. 2, laser device 26 has a laser-active solid 44, optically downstream from which a passive Q-switch 46 is provided. Laser-active solid 44, together with passive Q-switch 46 as well as input mirror 42 situated to the left of same in FIG. 2 and output mirror 48, form a laser oscillator whose oscillation response is a function of passive Q-switch 46, and which may thus be controlled, at least indirectly, in a manner known per se.

In the configuration of laser device 26 illustrated in FIG. 2, pumped light 60 is led through optical fiber device 280, previously described with reference to FIG. 1, from likewise previously described pumped light source 30 to input mirror 42. Since input mirror 42 is transparent to the wavelengths of pumped light 60, pumped light 60 penetrates laser-active solid 44, and results in a population inversion therein which is known per se.

When passive Q-switch 46 is in its base state, in which it has a relatively small transmission coefficient, laser operation is prevented in laser-active solid 44 or in solid 44, 46 delimited by input mirror 42 and output mirror 48. With increasing pumping duration, however, the radiation density in laser oscillator 42, 44, 46, 48 increases, so that passive Q-switch 46 fades, i.e., assumes a larger transmission coefficient, and laser operation is able to begin.

In this manner a laser pulse 24, also referred to as giant pulse, having a relatively high peak output is generated. Laser pulse 24 is injected into combustion chamber 14 (FIG. 1) of internal combustion engine 10, optionally using a further optical fiber device, or also directly through a combustion chamber window (not illustrated) of laser device 26, thus igniting fuel 22 present therein.

According to the present invention, optical fiber device 280 is designed and situated in the region of laser device 26 in such a way that radiation incident in the region of laser device 26 and/or in the region of combustion chamber 14 (FIG. 1) associated with laser device 26 may be injected into optical fiber device 280, so that, without providing separate optical fiber systems, solely by use of optical fiber device 280 it is possible to transmit radiation to be analyzed from the laser device to a remotely situated evaluation device.

FIG. 1 shows as an example such an evaluation device 100, which is situated at one end 281a of optical fiber device 280, at a distance from laser device 26, and in the present case, in the spatial proximity of pumped light source 30.

According to a first variant of the present invention, optical fiber device 280 according to the present invention may have a single optical fiber for conducting pumped light 60 (FIG. 2) and for conducting radiation to be analyzed, such as combustion chamber light and the like, for example, thus providing a particularly simple, compact, and economical configuration.

However, optical fiber device 280 according to the present invention may be formed from multiple individual optical fibers in particular combined into a strand, of which at least a first portion 280a (see FIG. 5a) is situated in the region of laser device 26 in such a way that radiation 70 incident in the region of laser device 26 and/or in the region of combustion chamber 14 associated with laser device 26 may be injected into this portion 280a of the optical fibers.

Figure 5A:
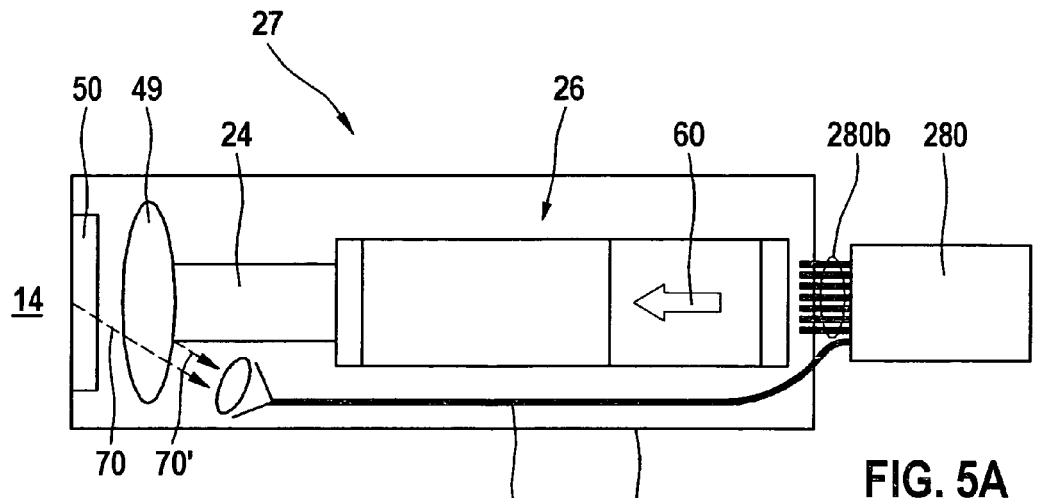
FIGS. 5a and 5b show further specific embodiments of the ignition device according to the present invention.

Radiation 70 may be, for example, pumped light 60 which is supplied to laser device 26 via optical fiber device 280 and which has been scattered in laser device 26, or may also be laser light 24 which is scattered, for example, in a housing 26' of laser device 26 on components 49, 50. For the most part, however, radiation 70 to be analyzed may be radiation which is generated as the result of combustion processes occurring in combustion chamber 14. FIG. 5a shows as an example a dashed-line arrow 70 which represents radiation entering from combustion chamber 14, through combustion chamber window 50, and into housing 26' of laser device 26. Radiation 70 may have a wavelength range in the range of the visible light and the UV light, for example.

As likewise illustrated in FIG. 5a, a portion 70' of the light which is part of laser pulse 24 and which is scattered, for example, on focusing lens 49 may also be injected into optical fiber 280a provided according to the present invention.

According to the present invention, an input lens (not illustrated in FIG. 5a) may also advantageously be provided which bundles radiation 70, 70' of interest into optical fiber 280a.

In the configuration illustrated in FIG. 5a, optical fiber 280a alone forms the first portion of the optical fibers within the meaning of the present invention, while second portion 280b of the optical fibers forming optical fiber device 280 is used solely for transmitting pumped light 60 to laser device 26.

Figure 5B:
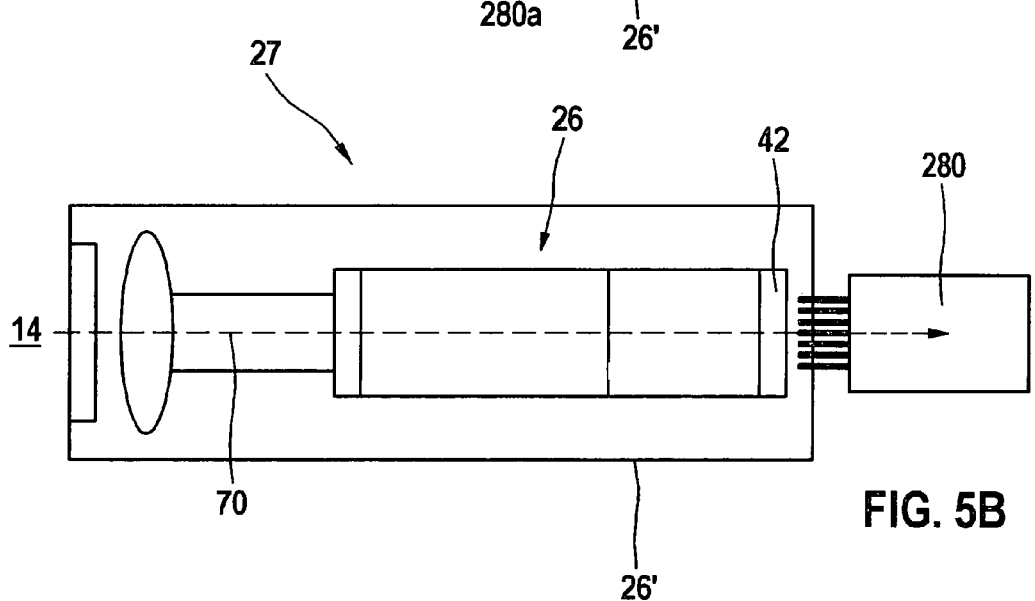

An alternative configuration of ignition device 27 according to the present invention is illustrated in FIG. 5b. In contrast to the configuration according to FIG. 5a, the variant of the present invention according to FIG. 5b has an optical fiber device 280 whose optical fibers are all situated opposite from an input mirror 42 of laser device 26. In this configuration, laser device 26 advantageously is at least partially transparent to radiation 70 emitted from combustion chamber 14 into housing 26', so that this radiation 70 may advantageously be injected through laser device 26 and into optical fiber device 280 and supplied to a remotely situated evaluation device (not illustrated). At the same time, use may advantageously be made of the entire optically active cross section of optical fiber device 280 for simultaneously transmitting pumped light 60 (FIG. 5a) to laser device 26, and for transmitting radiation 70 from laser device 26 to a remotely situated evaluation device. In contrast, in the configuration illustrated in FIG. 5a the optical cross section of optical fiber 280a is not usable for efficient action of pumped light 60 upon laser device 26.

According to the present invention it may advantageously be provided that a first portion 280a (see FIG. 3a) of the multiple optical fibers of optical fiber device 280 is used exclusively for transmitting radiation 70, injected in the region of laser device 26, to evaluation device 100 (FIG. 1). Second portion 280b, which includes the remaining optical fibers of optical fiber device 280, may be used for transmitting pumped light 60 to laser device 26.

The configuration of optical fiber device 280 described above according to FIG. 3a advantageously allows double use to be made of optical fiber device 280 for the simultaneous transmission of pumped light 60 and transmission of radiation 70 to be analyzed. However, the configuration according to FIG. 3a requires that individual optical fibers 280a, 280b be differentiated during manufacture of ignition device 27 in order to allow a targeted connection of the optical fibers of first portion 280a to evaluation device 100, and a targeted connection of the optical fibers of second portion 280b to pumped light source 30.

The requirement to make such a differentiation of individual optical fibers is avoided in a further very advantageous variant of the present invention, which is described below with reference to FIG. 3b. This variant of the present invention provides that a certain number of the optical fibers of optical fiber device 280, which may be at one end 281a at a distance from laser device 26 (see FIG. 1), are associated with evaluation device 100 likewise situated at that location. For example, the corresponding optical fibers may be mechanically separated from the remaining optical fibers of optical fiber device 280, and optically and mechanically connected to evaluation device 100.

However, according to the present invention it is advantageously provided that, for example, specific individual optical fibers of optical fiber device 280 are not selected in order to be optically or mechanically connected to evaluation device 100. Rather, according to the present invention any given selection is made from all the optical fibers of optical fiber device 280 in order to select the optical fibers which are connected to evaluation device 100. The statistical nature of this selection process thus ensures that a plurality of such optical fibers is usually associated with evaluation device 100, in which in the region of laser device 26 radiation 70 of interest to be analyzed is also actually injected. These types of optical fibers are illustrated in crosshatch in FIG. 3b. The remaining individual optical fibers of optical fiber device 280 not selected for connection to evaluation device 100 are therefore not connected to evaluation device 100 (FIG. 1), and are available for transmitting pumped light 60 from pumped light source 30 to laser device 26. In this variant of the present invention, to facilitate a simplified manufacturing process it has intentionally been taken into consideration that as a result of the statistical selection process, one or more optical fibers in which no radiation to be analyzed 70 is injected are also connected to evaluation device 100. These optical fibers thus do not contribute to the evaluation. Likewise, one or more of such optical fibers which actually conduct radiation to be analyzed may also be connected to pumped light source 30.

In a further very advantageous specific embodiment of ignition device 27 according to the present invention, it is provided that at least one optical fiber 280_1 has a geometry which differs from the geometry of the other optical fibers 280_2 of optical fiber device 280. Such a configuration is illustrated in FIG. 3c. As shown in FIG. 3c, the at least one optical fiber 280_1 has a much larger diameter than the other optical fibers 280_2 of optical fiber device 280, which are illustrated in crosshatch in FIG. 3c.

Such a different geometry allows the at least one optical fiber 280_1 to be easily mechanically separated from the other optical fibers 280_2 during a manufacturing process for ignition device 27 and thus, for example, allows the at least one optical fiber 280_1 to be associated with pumped light source 30, while the additional optical fibers 280_2 are connected not to pumped light source 30, but, rather, to evaluation device 100, for example (FIG. 1).

An inverse configuration is also possible in which optical fiber 280_1, for example, is used for transmitting radiation 70 from laser device 26 to evaluation device 100, while optical fibers 280_2 are used for transmitting pumped light 60 to laser device 26.

In a further very advantageous specific embodiment of ignition device 27 according to the present invention, it is provided that in a partial region 282 of its overall length optical fiber device 280 has a bending radius r which is selected in such a way that in partial region 282, radiation 60, 70 conducted by optical fiber device 280 may be at least partially extracted from optical fiber device 280.

A corresponding system according to the present invention for implementing bending radius r is shown in FIG. 4. FIG. 4 shows in a partial cross section a housing 100' which has an optical detector 101 and which thus provides functionality comparable to evaluation device 100 illustrated in FIG. 1. According to the present invention, evaluation device 100 according to FIG. 4 also advantageously has a channel 102 through which partial region 282 of optical fiber device 280 to be bent may be passed. As shown in FIG. 4, channel 102 has a curved section which implements specified bending radius r. When bending radius r is selected to be sufficiently small, the conditions for total reflection of radiation into the optical fibers, necessary for conducting radiation in optical fiber device 280, are no longer completely present, so that at least a portion of the radiation conducted in optical fiber device 280 is extracted from optical fiber device 280 (see arrow 71).

Accordingly, previously described detector 101 is situated in region 282 of the bend in optical fiber device 280 in order to receive radiation 71 extracted according to the present invention from optical fiber device 280 and, for example, to convert the radiation into an electrical signal.

The evaluation device illustrated in FIG. 4 advantageously has, for example, a two-part housing, it preferably being possible to detachably connect the corresponding housing halves to one another so that optical fiber device 280 may be inserted into channel 102 when housing 100' is opened. Optical fiber device 280 is mechanically fixed in evaluation device 100 by subsequently closing housing 100', thus ensuring that specified bending radius r is maintained, and therefore radiation 71 is extracted from optical fiber device 280 in a defined manner.

Housing 100' of evaluation device 100 according to FIG. 4 may, for example, also be integrally molded onto a housing containing pumped light source 30 (FIG. 1). Furthermore, alternative configurations are conceivable in which separate means, which in particular are not integrated into housing 100' of evaluation device 100, are provided for implementing bending radius r.

FIG. 3e shows a schematic diagram of a further configuration according to the present invention in which optical fiber device 280 is equally curved according to the present invention at two regions 282a, 282b in order to extract radiation 71a, 71b. Because the condition for total reflection in optical fiber device 280 or the optical fibers contained therein is a function of the wavelength, by appropriate selection of bending radius ra, rb it is possible to specify the particular wavelengths which may be extracted from optical fiber device 280 via the curvature thereof according to the present invention. For example, a first radius of curvature ra in region 282a may be selected in such a way that only radiation 71a of a first wavelength range is extracted from optical fiber device 280. Radius of curvature rb of other region 282b is selected to be different, so that radiation 71b of a different wavelength range is accordingly extracted from region 282b of optical fiber device 280.

According to the present invention, in a very particularly advantageous manner it is provided that bending radius r is selected in such a way that ideally no pumped light 60 is extracted from optical fiber device 280 in order to allow efficient pumping of laser device 26. Rather, the aim is to extract from optical fiber device 280 only a specifiable proportion of radiation 70, 71a, 71b to be analyzed. For this purpose pumped light source 30, laser device 26, and corresponding bending radii r, ra, rb are appropriately matched to one another.

Figure 6:
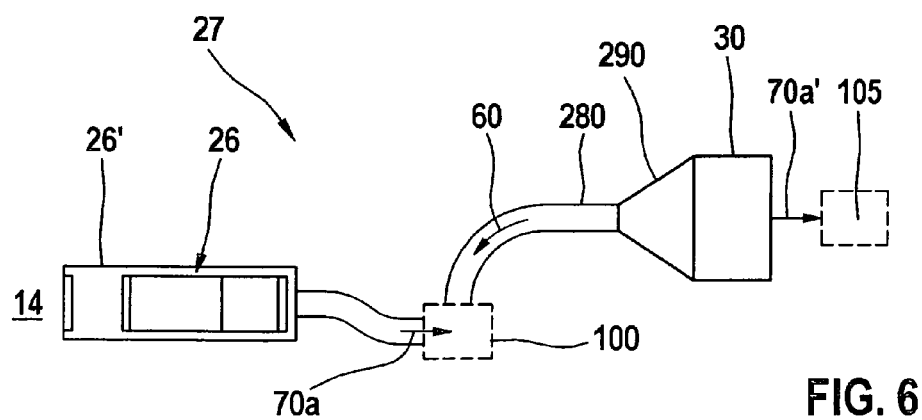
FIG. 6 shows a specific embodiment of the ignition device according to the present invention, having an optical cross-section converter.

FIG. 6 shows a further very advantageous specific embodiment of ignition device 27 according to the present invention, in which an evaluation device according to FIG. 4 is indicated in the form of a dashed-line rectangle 100. This evaluation device 100 is used for extracting a first portion 70a of radiation to be analyzed.

The configuration according to FIG. 6 also has an additional evaluation device 105 provided optically downstream from a pumped light source 30.

The configuration illustrated in FIG. 6 also has an optical cross-section converter 290 which transforms the essentially linear or rectangular beam cross section of pumped light source 30 into a circular cross section of optical fiber device 280. This may be carried out, for example, by the fact that optical cross-section converter 290 fixes the individual optical fibers of optical fiber system 280 relative to one another in a specifiable manner, resulting, for example, in a configuration which is comparable to the beam cross section of pumped light source 30. In the further course of optical fiber device 280 the individual optical fibers may be combined into a single strand which optionally may be enclosed by a protective sheathing, for example metallic braiding or the like.

Laser device 26 from FIG. 6 is supplied with pumped light 60 via pumped light source 30, optical cross-section converter 290, and optical fiber device 280 in a manner known per se. Radiation injected in the region of laser device 26 into optical fiber device 280 or into individual optical fibers thereof may be extracted in the form of first portion 70a, using evaluation device 100. A further portion 70a' of the radiation to be analyzed passes through optical cross-section converter 290 and pumped light source 30, thus reaching additional evaluation device 105. This is advantageously made possible by the fact that a semiconductor laser which forms pumped light source 30 is essentially transparent to the wavelengths of portion 70a' of the radiation to be analyzed.

Although in the specific embodiment according to FIG. 6 both evaluation devices 100, 105 are illustrated, it is naturally understood that providing only one of these two evaluation devices allows radiation 70 to be efficiently evaluated.

For variants of ignition device 27 according to the present invention in which the extraction of radiation 70 from optical fiber device 280 is enabled by controlled bending of optical fiber device 280 by a specifiable bending radius r, according to the present invention it may be further advantageously provided that an optoelectric converter, an evaluation device, or the like is integrated directly into optical fiber device 280. FIG. 3d shows as an example a partial cross section of such an optical fiber device 280. It is shown in FIG. 3d that an optoelectric converter 106 is situated inside a sheathing 283 of optical fiber device 280 which is thus directly optically connected to at least one optical fiber of optical fiber device 280, in the present case, which may be to the central optical fiber, which has a relatively large cross section. Optoelectric converter 106 is provided directly in the region of the planned bend in optical fiber device 280, it being important to ensure a correct angular position in order to allow efficient injection of radiation into converter 106. A ring-shaped converter may also advantageously be provided which has, for example, multiple radially interspaced photodetectors, etc. and which at least partially encloses optical fiber device 280, in which case it is no longer necessary to maintain a correct angular position in the bend of optical fiber device 280.

According to the exemplary embodiments and/or exemplary methods of the present invention, electrical connecting lines for optoelectric converter 106 may likewise advantageously be integrated into optical fiber device 280 in such a way that the connecting lines are guided parallel to the other optical fibers and are protected by common sheathing 283. Instead of an optoelectric converter 106, according to the exemplary embodiments and/or exemplary methods of the present invention an additional optical fiber may be provided which is situated in the region to be bent in such a way that, due to the bending, radiation exiting from the optical fiber in question is injected into the additional optical fiber, which delivers the radiation to a remotely situated detector.

The principle according to the exemplary embodiments and/or exemplary methods of the present invention of extracting radiation from optical fiber device 280 via a forced curvature or bend of optical fiber device 280 in the affected region may also be advantageously used for optical fiber devices 280 which have a single optical fiber. In addition, according to the present invention, radiation 70 from laser device 26 may likewise be returned to the optoelectric converter or evaluation device 105 according to FIG. 6 using an optical fiber device 280 having a single optical fiber.

What is claimed is:

1. An ignition device, for an internal combustion engine of a motor vehicle, comprising:
   a laser device for generating laser pulses;
   an optical fiber device which is at least optically connected to the laser device for supplying the laser device with pumped light, wherein the optical fiber device is configured and situated in a region of the laser device so that radiation incident at least one of in the region of the laser device and in a region of a combustion chamber associated with the laser device may be injected into the optical fiber device;
   wherein in a partial region of its overall length the optical fiber device has a bending radius which is selected so that in the partial region radiation conducted from the optical fiber device may be at least partially extracted from the optical fiber device.

2. The ignition device of claim 1, wherein the bending radius is selected so that pumped light of a first wavelength is not extractable in the partial region, but radiation of wavelengths which differ from the first wavelength of the pumped light may be extracted in the partial region.

3. The ignition device of claim 1, wherein the optical fiber device has multiple partial regions with different bending radii, in which in each case radiation of different wavelengths may be extracted.

4. The ignition device of claim 1, wherein the optical fiber device in the partial region or regions has an opening in a sheathing surrounding same, or has a region of the sheathing which is at least partially transparent to the radiation to be extracted.

5. The ignition device of claim 1, wherein the optical fiber device has in the partial region or regions one integrated evaluation device, and at least one of an optoelectric converter and one additional optical fiber which is spatially separated from the remaining optical fibers.

6. The ignition device of claim 5, wherein electrical connecting cables are integrated at least one of into the optical fiber device and into the sheathing thereof.

7. An ignition device, for an internal combustion engine of a motor vehicle, comprising:
   a laser device for generating laser pulses;
   an optical fiber device which is at least optically connected to the laser device for supplying the laser device with pumped light, wherein the optical fiber device is configured and situated in a region of the laser device so that radiation incident at least one of in the region of the laser device and in a region of a combustion chamber associated with the laser device may be injected into the optical fiber device;
   wherein a pumped light source for generating the pumped light and an evaluation device for evaluating the radiation are provided at one end of the optical fiber device, situated at a distance from the laser device, the pumped light source being situated between the end of the optical fiber device and the evaluation device and being at least partially transparent to the radiation.

8. An ignition device, for an internal combustion engine of a motor vehicle, comprising:
   a laser device for generating laser pulses;
   an optical fiber device which is at least optically connected to the laser device for supplying the laser device with pumped light, wherein the optical fiber device is configured and situated in a region of the laser device so that radiation incident at least one of in the region of the laser device and in a region of a combustion chamber associated with the laser device may be injected into the optical fiber device;
   wherein the optical fiber device has multiple optical fibers, wherein at least a first portion of the optical fibers is provided in the region of the laser device so that the radiation incident at least one of in the region of the laser device and in the region of the combustion chamber may be injected into this portion of the optical fibers;
   wherein at one end of the optical fiber device, situated at a distance from the laser device, an optical cross-section converter is provided which fixes the individual optical fibers of the optical fiber system relative to one another in a specifiable manner, so that the individual optical fibers in the optical cross-section converter together form a cross section which differs from the cross section of the optical fiber device.

9. A method for manufacturing an ignition device for an internal combustion engine of a motor vehicle, the method comprising:
   forming an optical fiber device from multiple individual optical fibers in particular combined into a strand; and
   providing a laser device for generating laser pulses, and the optical fiber device which is at least optically connected to the laser device for supplying the laser device with pumped light;
   wherein at least a first portion of the optical fibers is situated in a region of the laser device so that radiation incident at least one of in the region of the laser device and in the region of a combustion chamber associated with the laser device may be injected into the first portion of the optical fibers;
   wherein in a partial region of its overall length the optical fiber device is bent according to a specifiable bending radius so that in the partial region, radiation conducted from the optical fiber device may be at least partially extracted from the optical fiber device.

10. The method of claim 9, wherein one evaluation device, and at least one of an optoelectric converter, and one additional optical fiber which is spatially separated from the remaining optical fibers, are integrated in the partial region.

11. The method of claim 9, wherein electrical connecting cables are integrated at least one of into the optical fiber device and into the sheathing thereof.

* * * * *

UNITED STATES PATENT AND TRADEMARK OFFICE
CERTIFICATE OF CORRECTION

PATENT NO.        : 8,712,197 B2
APPLICATION NO. : 12/733651
DATED             : April 29, 2014
INVENTOR(S)       : Herden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this
Twenty-ninth Day of September, 2015

Michelle K. Lee
*Director of the United States Patent and Trademark Office*